(12) United States Patent
Liu et al.

(10) Patent No.: US 11,032,568 B2
(45) Date of Patent: Jun. 8, 2021

(54) METHOD OF VIDEO CODING USING PREDICTION BASED ON INTRA PICTURE BLOCK COPY

(71) Applicant: HFI INNOVATION INC., Zhubei (TW)

(72) Inventors: Shan Liu, San Jose, CA (US); Xiaozhong Xu, Fremont, CA (US)

(73) Assignee: HFI INNOVATION INC., Zhubei (TW)

( * ) Notice: Subject to any disclaimer, the term of this patent is extended or adjusted under 35 U.S.C. 154(b) by 754 days.

(21) Appl. No.: 15/025,118

(22) PCT Filed: Nov. 14, 2014

(86) PCT No.: PCT/CN2014/091058
§ 371 (c)(1),
(2) Date: Mar. 25, 2016

(87) PCT Pub. No.: WO2015/078304
PCT Pub. Date: Jun. 4, 2015

(65) Prior Publication Data
US 2016/0227245 A1 Aug. 4, 2016

Related U.S. Application Data (60) Provisional application No. 61/926,577, filed on Jan. 13, 2014, provisional application No. 61/909,499, filed on Nov. 27, 2013.

(51) Int. Cl.
*H04N 19/593* (2014.01)
*H04N 19/52* (2014.01)
(Continued)

(52) U.S. Cl.
CPC ......... *H04N 19/593* (2014.11); *H04N 19/107* (2014.11); *H04N 19/122* (2014.11);
(Continued)

(58) Field of Classification Search
CPC .... H04N 19/107; H04N 19/122; H04N 19/13; H04N 19/137; H04N 19/159;
(Continued)

(56) References Cited

U.S. PATENT DOCUMENTS

2011/0096834 A1 4/2011 Cheon et al.
2012/0243608 A1 9/2012 Yu et al.
(Continued)

FOREIGN PATENT DOCUMENTS

CA 2 824 473 A1 7/2012
CN 101159874 4/2008
(Continued)

OTHER PUBLICATIONS

International Search Report dated Feb. 15, 2015, issued in application No. PCT/CN2014/091058.
(Continued)

*Primary Examiner* — William C Vaughn, Jr.
*Assistant Examiner* — Naod W Belai
(74) *Attorney, Agent, or Firm* — Oblon, McClelland, Maier & Neustadt, L.L.P.

(57) ABSTRACT

A method of signaling of coding modes including an IntraBC mode (Intra-block copy mode) to improve the coding efficiency is disclosed. In one embodiment, the partition mode associated with IntraBC mode and the corresponding partition mode for Inter mode use the same binarization process and the same context modelling. In another embodiment, the displacement vector of IntraBC prediction for the chroma block is derived from the displacement vectors of the corresponding luma block. In yet another embodiment, a non-square PU is partitioned into multiple TUs (transform units) and IntraBC prediction is performed TU by TU.

12 Claims, 7 Drawing Sheets

(51) Int. Cl.

| | | |
|---|---|---|
| *H04N 19/186* | (2014.01) | |
| *H04N 19/91* | (2014.01) | |
| *H04N 19/107* | (2014.01) | |
| *H04N 19/122* | (2014.01) | |
| *H04N 19/13* | (2014.01) | |
| *H04N 19/137* | (2014.01) | |
| *H04N 19/159* | (2014.01) | |
| *H04N 19/176* | (2014.01) | |
| *H04N 19/61* | (2014.01) | |
| *H04N 19/96* | (2014.01) | |
| *H04N 19/70* | (2014.01) | |

(52) U.S. Cl.
CPC ........... *H04N 19/13* (2014.11); *H04N 19/137* (2014.11); *H04N 19/159* (2014.11); *H04N 19/176* (2014.11); *H04N 19/186* (2014.11); *H04N 19/52* (2014.11); *H04N 19/61* (2014.11); *H04N 19/91* (2014.11); *H04N 19/96* (2014.11); *H04N 19/70* (2014.11)

(58) Field of Classification Search
CPC .... H04N 19/176; H04N 19/186; H04N 19/52; H04N 19/593; H04N 19/61; H04N 19/70; H04N 19/91; H04N 19/96
See application file for complete search history.

(56) References Cited

U.S. PATENT DOCUMENTS

| | | | |
|---|---|---|---|
| 2013/0077684 A1 | 3/2013 | Chen et al. | |
| 2013/0114671 A1* | 5/2013 | Chien | H04N 19/60 375/240.02 |
| 2013/0136180 A1* | 5/2013 | Yang | H04N 19/176 375/240.13 |
| 2013/0148729 A1 | 6/2013 | Sasai et al. | |
| 2013/0188704 A1* | 7/2013 | Zhou | H04N 19/176 375/240.12 |
| 2015/0071357 A1* | 3/2015 | Pang | H04N 19/593 375/240.16 |
| 2015/0103906 A1 | 4/2015 | Zhao et al. | |
| 2015/0172716 A1 | 6/2015 | Chen | |
| 2015/0195559 A1* | 7/2015 | Chen | H04N 19/52 375/240.16 |
| 2016/0241868 A1* | 8/2016 | Li | H04N 19/86 |

FOREIGN PATENT DOCUMENTS

| | | |
|---|---|---|
| CN | 102098519 | 6/2011 |
| CN | 103024373 A | 4/2013 |
| EP | 2 725 791 A1 | 4/2014 |
| KR | 10-2013-0121932 A | 11/2013 |
| RU | 2 517 404 C2 | 5/2014 |
| WO | WO 2013/070353 A1 | 5/2013 |
| WO | 2013/106705 A2 | 7/2013 |

OTHER PUBLICATIONS

Office Action dated Dec. 24, 2019 in corresponding Indian Patent Application No. 201627021696 (with English Translation), 8 pages.
Chen, C.C., et al.; "Screen content coding using non-square intra block copy for HEVC;" pp. 1-6.
Li, B., et al.; "Non-SCCE1: Unification of intra BC and inter modes;" Joint Collaborative Team on Video Coding (JCT-VC) of ITU-T SG 16 WP 2 and ISO/IEC JTC 1/SC 29/WG 11; Jun.-Jul. 2014; pp. 1-28.
Flynn, D., et al.; "High Efficiency Video Coding (HEVC) Range Extensions text specification: Draft 5;" Joint Collaborative Team on Video Coding (JCT-VC) of ITU-T SG 16 WP 2 and ISO/IEC JTC 1/SC 29/WG 11; Apr. 2013; pp. 1-341.

* cited by examiner

METHOD OF VIDEO CODING USING PREDICTION BASED ON INTRA PICTURE BLOCK COPY

CROSS REFERENCE TO RELATED APPLICATIONS

The present invention is a National Stage Application of PCT No. PCT/CN2014091058, filed on Nov. 14, 2014, which claims priority to U.S. Provisional Patent Application, Ser. No. 61/909,499, filed on Nov. 27, 2013, entitled "Methods and apparatus for intra picture block copy partitions in video compression" and U.S. Provisional Patent Application, Ser. No. 61/926,577, filed on Jan. 13, 2014, entitled "Methods and apparatus for intra picture block copy in video compression". The priority Applications are hereby incorporated by reference in their entireties.

TECHNICAL FIELD

The present invention relates to video coding using Intra-block copy (IntraBC) mode. In particular, the present invention relates to techniques to improve the performance or simplify the processing of the Intra-block copy (IntraBC) coding mode for screen content coding or video coding.

BACKGROUND

Figure 1:
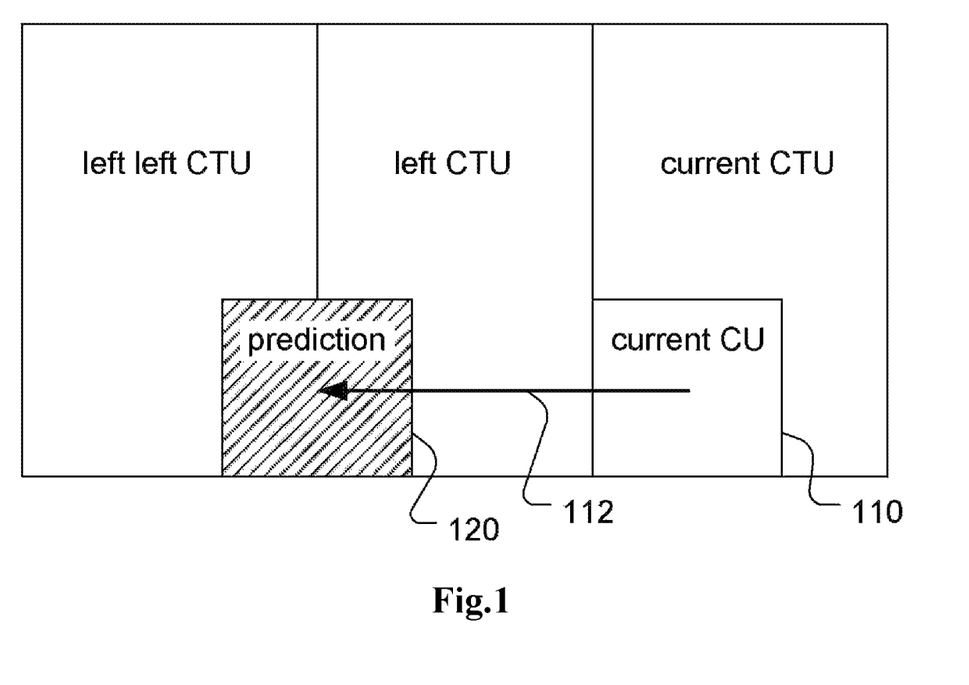
FIG. 1 illustrates an example of Intra motion compensation according to the Intra-block copy (IntraBC) mode, where a horizontal displacement vector is used.

In the current development of range extension (RExt) or screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC Range Extension and screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transform (such as discrete cosine transform (DCT)).

In JCTVC-M0350, the Intra MC is different from the motion compensation used for Inter prediction in at least the following areas:

MVs are restricted to be 1-D for Intra MC (i.e., either horizontal or vertical) while Inter prediction uses 2-D motion estimation.

Binarization is fixed length for Intra MC while Inter prediction uses exponential-Golomb.

Intra MC introduces a new syntax element to signal whether the MV is horizontal or vertical.

Based on JCTVC-M0350, some modifications are disclosed by Pang, et al. in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-NO256 (hereinafter JCTVC-NO256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-NO256, two MV coding methods were disclosed:

Method 1—Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.

Method 2: No Motion vector prediction. The MV is coded using the exponential-Golomb codes that are used for MVD in HEVC.

Another difference disclosed in JCTVC-N0256 is that the 2-D Intra MC is further combined with the pipeline friendly approach:
1. No interpolation filters are used,
2. MV search area is restricted. Two cases are disclosed:
   a. Search area is the current CTU and the left CTU or
   b. Search area is the current CTU and the rightmost 4 column samples of the left CTU.

Among the proposed methods in JCTVC-NO256, the 2-D Intra MC, the removal of interpolation filters, and the search area constraint to the current CTU and the left CTU have been adopted in a new version draft standard. The CU level syntax corresponding to JCTVC-NO256 has been incorporated in *High Efficiency Video Coding* (HEVC) *Range Extension text specification: Draft 4* (RExt Draft 4), Flynn, et al., Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N1005. The CU level syntax adopted in RExt Draft 4 is shown in Table 1.

TABLE 1

| coding_unit( x0, y0, log2CbSize ) { | Descriptor | Note |
|---|---|---|
| if( transquant_bypass_enabled_flag ) | | |
|     cu_transquant_bypass_flag | ae(v) | |
| if( slice_type != I ) | | |
|     cu_skip_flag[ x0 ][ y0 ] | ae(v) | |
| nCbS = ( 1 << log2CbSize ) | | |
| if( cu_skip_flag[ x0 ][ y0 ] ) | | |
|     prediction_unit( x0, y0, nCbS, nCbS ) | | |
| else { | | |
|   if( intra_block_copy_enabled_flag ) | | (1-1) |
|     intra_bc_flag[ x0 ][ y0 ] | ae(v) | |

TABLE 1-continued

| coding_unit( x0, y0, log2CbSize ) { | Descriptor | Note |
|---|---|---|
|     if( !intra_bc_flag[ x0 ][ y0 ] ) { | | (1-2) |
|       if( slice_type != I ) | | (1-3) |
|         pred_mode_flag | ae(v) | |
|       if( CuPredMode[ x0 ][ y0 ] | | (1-4) |
|         !=MODE_INTRA \|\| log2CbSize = = | | |
|         MinCbLog2SizeY ) | ae(v) | |
|         part_mode | | |
|     } | | |
| ...... | | |

As shown in Table 1, a test "if(intra_block_copy_enabled_ flag)" is performed as indicated by Note (1-1). The IntraBC flag (i.e., intra_bc_flag[x0][y0]) is incorporated if Intra block copy is enabled as indicated by intra_block_copy_enabled_flag. Syntax element intra_bc_flag indicates whether the associated block is coded in the IntraBC mode. Whether the current block is coded in Non-Intra block copy mode (i.e., if(!intra_bc_flag[x0][y0]) is checked as indicated by Note (1-2), and pred_mode_flag and part_mode may be incorporated according to the tests in Notes (1-3) and (1-4) if the block is not coded in the Intra block copy mode. Syntax element pred_mode_flag equal to 0 specifies that the current coding unit is coded in Inter prediction mode. pred_mode_flag equal to 1 specifies that the current coding unit is coded in Intra prediction mode. Syntax element part_mode specifies partitioning mode of the current coding unit.

Figure 2A:
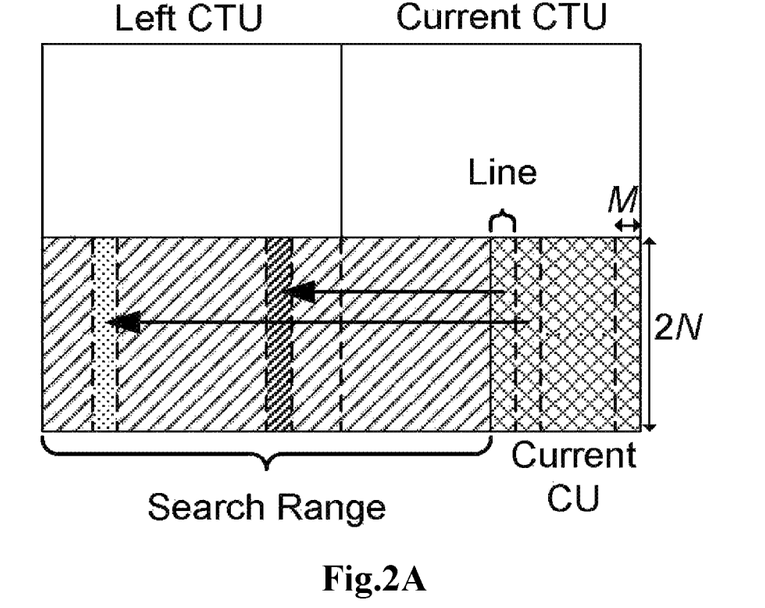
FIGS. 2A-B illustrate examples of line-based Intra-block copy (IntraBC) prediction, where a coding unit (CU) is partitioned into vertical or horizontal blocks, named lines.
Figure 2B:
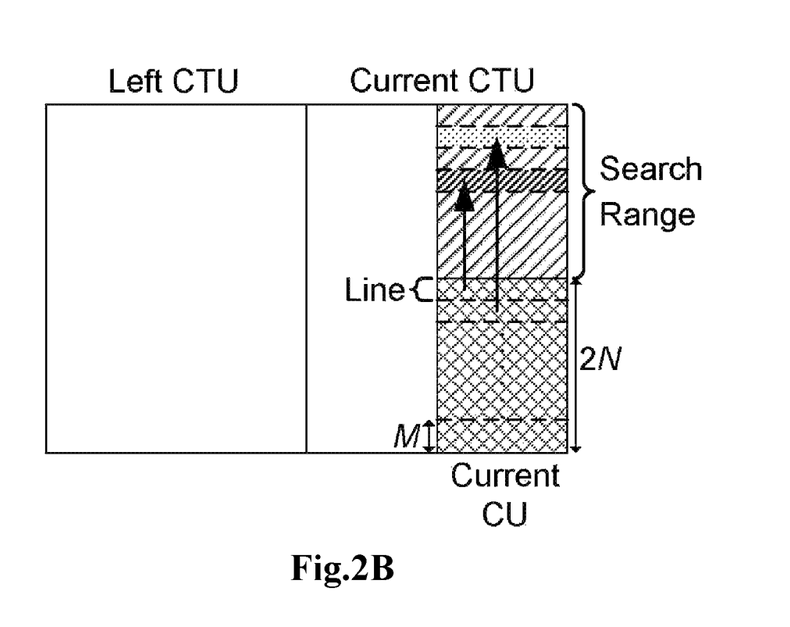

Another variation of IntraBC method, named *Line-based Intra Block Copy* has been disclosed by Chen, et al., in *AHG*8. *Line-based Intra Block Copy*, Joint Collaborative Team on Video Coding (JCT-VC) of ITU-T SG 16 WP 3 and ISO/IEC JTC 1/SC 29/WG 11, JCTVC-O0205, 15th Meeting: Geneva, CH, 23 Oct. -1 Nov. 2013, Document: JCTVC-O0205 (hereinafter JCTVC-O0205). FIG. 2A and FIG. 2B illustrate examples of line-based IntraBC method as disclosed in JCTVC-O0205, where a 2N×2N CU is split equally into multiple block partitions of size M×2N (FIG. 2A) or 2N×M (FIG. 2B). The partitioned blocks are termed as lines and M represents a power-of-2 integer and is smaller than 2N. For each line, pixels are predicted in the same way as the original IntraBC except: (1) the block size is of M×2N or 2N×M, and (2) blocks of size M×2N and 2N×M are restricted to only perform horizontal search and vertical search, respectively. Therefore, there are 2N/M Intra displacement vectors per CU needed to be searched and signaled. FIG. 2A illustrates an example of partitioning the CU horizontally into M×2N lines or line blocks. Each line block may be predicted by a prediction line block in the left CTU that has been reconstructed already. The arrows in FIG. 2A represent the displacement vectors or motion vectors for corresponding line blocks. FIG. 2B illustrates an example of partitioning the CU vertically into 2N×M lines or line blocks. Each line block may be predicted by a prediction line block in the CTU above the current CU that has been reconstructed already. The arrows in FIG. 2B represent the displacement vectors or motion vectors for corresponding line blocks. The improvement according to JCTVC-O0205 has shown significant BD-rate reduction over the conventional IntraBC approach. The BD-rate is a well-known performance measurement in the field of video coding.

Table 2 illustrates an example of CU level syntax modification to support the line-based IntraBC as disclosed in JCTVC-O0205.

TABLE 2

| coding_unit( x0, y0, log2CbSize ) { | Descriptor | Note |
|---|---|---|
|   if( transquant_bypass_enabled_flag ) | | |
|     cu_transquant_bypass_flag | ae(v) | |
|   if( slice_type != I ) | | |
|     cu_skip_flag[ x0 ][ y0 ] | ae(v) | |
|   nCbS = ( 1 << log2CbSize ) | | |
|   if( cu_skip_flag[ x0 ][ y0 ] ) | | |
|     prediction_unit( x0, y0, nCbS, nCbS ) | | |
|   else { | | |
|     if( intra_block_copy_enabled_flag ) | | |
|       intra_bc_flag[ x0 ][ y0 ] | ae(v) | |
|     if( !intra_bc_flag[ x0 ][ y0 ] ) { | | |
|       if( slice_type != I ) | | |
|         pred_mode_flag | ae(v) | |
|       if( CuPredMode[ x0 ][ y0 ] != | | |
|         MODE_INTRA \|\|log2CbSize = = | | |
|         MinCbLog2SizeY ) | | |
|         part_mode | ae(v) | |
|       if( CuPredMode[ x0 ][ y0 ] == | | (2-1) |
|         MODE_INTRA && PartMode != | | |
|         PART_N×N) { | | |
|         ivm_flag | ae(v) | (2-2) |
|         if( ivm_flag) | | (2-3) |
|           ivm_dir | ae(v) | (2-4) |
|         } | | |
|   } | | |
| ...... | | |

As shown in Table 2, a flag ivm_flag is incorporated in the syntax table as indicated by Note (2-2) if the prediction mode is MODE_INTRA and the partition mode is not PART_N×N as indicated by Note (2-1). ivm_flag equal to 1 specifies that line-based IntraBC is used for the current CU. ivm_flag equal to 0 specifies that line-based IntraBC is not used for the current CU. If the flag ivm_flag has a value of 1 as indicated by Note (2-3), an addition flag ivm_dir is incorporated as indicated by Note (2-4). ivm_dir equal to 1 specifies that line-based IntraBC is along the vertical direction for the current CU. ivm_flag equal to 0 specifies that line-based IntraBC is along the horizontal direction for the current CU. According to JCTVC-O0205, the value of M (i.e., 1, 4, or N) is pre-set, i.e. hard coded without signaling.

SUMMARY

A method of signaling of coding modes including an IntraBC mode (Intra-block copy mode) according to the present invention is disclosed. CABAC (context-adaptive binary arithmetic coding) may be used to code the partition mode associated with IntraBC mode. In one embodiment, the partition mode associated with IntraBC mode and the corresponding partition mode for Inter mode use the same binarization process and the same context modelling. One or more high-level syntax elements can be incorporated in a sequence level, a picture level or a slice level to indicate whether non-square partition is enabled. The prediction mode group may consist of 2N×2N, 2N×N, N×2N and N×N modes if the current coding unit is 8×8, and the binarization process maps the 2N×2N, 2N×N, N×2N and N×N modes to {1, 01, 001, 000} respectively, {1, 001, 01, 000} respectively, {1, 001, 000, 01} respectively, or {1, 000, 001, 01} respectively. The prediction mode group may consist of 2N×2N, 2N×N and N×2N modes if the current coding unit is larger than 8×8, and the binarization process maps the 2N×2N, 2N×N and N×2N modes to {1, 01, 00} respectively or {1, 00, 01} respectively.

In another embodiment, the IntraBC mode is applied to color video with luma and chroma components. In the case that non 4:4:4 formats (e.g., 4:2:2 or 4:2:0) are used, the displacement vector of IntraBC prediction for the chroma block can be derived from the displacement vectors of the corresponding luma block. For example, when the current luma CU is divided into 4 luma PUs and the corresponding current chroma CU is divided into one chroma PU, the chroma displacement vector for the chroma PU can be determined from the average of 4 luma displacement vectors associated with the 4 luma PUs or from any one of the 4 luma displacement vectors associated with the 4 luma PUs. In another example, the current luma CU is divided into 2 luma PUs and the corresponding current chroma CU is divided into one chroma PU, the chroma displacement vector for the chroma PU can be determined from the average of 2 luma displacement vectors associated with the 2 luma PUs or from any one of the 2 luma displacement vectors associated with the 2 luma PUs.

In yet another embodiment, the IntraBC prediction is performed at TU (transform unit) level, where a non-square PU is partitioned into multiple TUs and IntraBC prediction is performed TU by TU. Accordingly prediction block previously unavailable for PU-based IntraBC prediction may become available for TU-based IntraBC prediction. The displacement vectors for the TUs may use the displacement vector of the corresponding PU.

DETAILED DESCRIPTION

In order to improve the performance or to reduce the complexity of Intra-block copy (IntraBC) prediction, the present invention discloses various improvements and simplified IntraBC prediction.

First Embodiment

In this embodiment, IntraBC prediction partition mode is signaled using context modeling independent of that for Inter prediction partition. Two embodiments of the binarization of part_mode with intra_bc_flag equal to 1 as shown in Tables 3 and 4 can be used. The binary strings can be entropy coded using CABAC (context-adaptive binary arithmetic coding). When each of these bits is coded, it can use its own context model that is designed for its context updates, which is independent of the counterpart Inter prediction. Take Table 3 for example, if Inter 2N×N mode is binarized as "01" the IntraBC 2N×N mode is binarized as the same "01" as shown in Table 3. However, the bit "0" in IntraBC 2N×N mode will use a context model different from the bit "0" in Inter 2N×N mode. Similarly, the bins for all partition modes have their own context models, which are independent of their counterpart Inter partition modes.

TABLE 3

| part_mode | PartMode | Bin string |
|---|---|---|
| 0 | PART_2N × 2N | 1 |
| 1 | PART_2N × N | 01 |
| 2 | PART_N × 2N | 001 |
| 3 | PART_N × N | 000 |

TABLE 4

| part_mode | PartMode | Bin string |
|---|---|---|
| 0 | PART_2N × 2N | 1 |
| 1 | PART_N × 2N | 01 |
| 2 | PART_2N × N | 001 |
| 3 | PART_N × N | 000 |

Second Embodiment

While the first embodiment uses individual context modelling for IntraBC partition modes and Inter partition mode, the second embodiment uses shared context modelling. When each of these bits is coded, it uses the same context model as that designed for its corresponding Inter and IntraBC partition modes. For example, if Inter 2N×N mode is binarized as "01" the IntraBC 2N×N mode is binarized as the same "01" in Table 3. Therefore the bit "0" in IntraBC 2N×N mode will share the context model with the bit "0" in Inter 2N×N mode. Same strategy can be applied to the bit "1" in Inter 2N×N mode and IntraBC 2N×N mode. Similarly, the bins for all partition modes have the same context models for Inter and Intra partition modes.

Third Embodiment

This embodiment corresponds to a combination of high level syntax flags and binarization of individual blocks. For example, the high level syntax flags can be used to enable or disable these methods in sequence level, picture level or slice level On the other hand, the N×N partition for IntraBC can be only allowed when the block is a SCU (smallest CU). Examples of the binarization of part_mode with intra_bc_flag equal to 1 according to the third embodiment are shown in Tables 5 to 8.

TABLE 5

| | | Bin string | | | |
|---|---|---|---|---|---|
| | | !non_square_ibc_enabled_flag | | non_square_ibc_enabled_flag | |
| part_mode | PartMode | log2CbSize > MinCbLog2SizeY | log2CbSize == MinCbLog2SizeY | log2CbSize > MinCbLog2SizeY | log2CbSize == MinCbLog2SizeY |
| 0 | PART_2N × 2N | 1 | 1 | 1 | 1 |
| 1 | PART_N × N | | 0 | | 01 |
| 2 | PART_N × 2N | | | 01 | 001 |
| 3 | PART_2N × N | | | 00 | 000 |

TABLE 6

| | | Bin string | | | |
|---|---|---|---|---|---|
| | | !non_square_ibc_enabled_flag | | non_square_ibc_enabled_flag | |
| part_mode | PartMode | log2CbSize > MinCbLog2SizeY | log2CbSize == MinCbLog2SizeY | log2CbSize > MinCbLog2SizeY | log2CbSize == MinCbLog2SizeY |
| 0 | PART_2N × 2N | 1 | 1 | 1 | 1 |
| 1 | PART_N × 2N | | | 01 | 01 |
| 2 | PART_2N × N | | | 00 | 001 |
| 3 | PART_N × N | | 0 | | 000 |

TABLE 7

| | | Bin string | | | |
|---|---|---|---|---|---|
| | | !non_square_ibc_enabled_flag | | non_square_ibc_enabled_flag | |
| part_mode | PartMode | log2CbSize > MinCbLog2SizeY | log2CbSize == MinCbLog2SizeY | log2CbSize > MinCbLog2SizeY | log2CbSize == MinCbLog2SizeY |
| 0 | PART_2N × 2N | 1 | 1 | 1 | 1 |
| 1 | PART_N × N | | 0 | | 01 |
| 2 | PART_2N × N | | | 01 | 001 |
| 3 | PART_N × 2N | | | 00 | 000 |

TABLE 8

| | | Bin string | | | |
|---|---|---|---|---|---|
| | | !non_square_ibc_enabled_flag | | non_square_ibc_enabled_flag | |
| part_mode | PartMode | log2CbSize > MinCbLog2SizeY | log2CbSize == MinCbLog2SizeY | log2CbSize > MinCbLog2SizeY | log2CbSize == MinCbLog2SizeY |
| 0 | PART_2N × 2N | 1 | 1 | 1 | 1 |
| 1 | PART_N × N | | 0 | | 01 |
| 2 | PART_N × 2N | | | 01 | 001 |
| 3 | PART_2N × N | | | 00 | 000 |

Fourth Embodiment

Currently, the smallest coding block (CB) size for luma component is 8×8. With this CB size, there is a possibility that more than 1 PB (prediction block) in the CB can be used. There may be 4 PBs with size N×N or 2 PBs with size 2N×N or N×2N in this luma CB. Accordingly, the luma PB size of an IntraBC coded CB can be set to 4×4, or 8×4 or 4×8. According to the Luma-Chroma pixel correspondence in picture format, the corresponding chroma component sizes in these cases, for different color format are summarized in Table 9.

TABLE 9

| Color Format | Luma CB size | Luma PB size | No. of PBs | Chroma CB size | Chroma PB size | No. of PBs |
| --- | --- | --- | --- | --- | --- | --- |
| 4:4:4 | 8 × 8 | 4 × 4 | 4 | 8 × 8 | 4 × 4 | 4 |
|  | 8 × 8 | 8 × 4 | 2 | 8 × 8 | 8 × 4 | 2 |
|  | 8 × 8 | 4 × 8 | 2 | 8 × 8 | 4 × 8 | 2 |
| 4:2:2 | 8 × 8 | 4 × 4 | 4 | 4 × 8 | 2 × 4 | 4 |
|  | 8 × 8 | 8 × 4 | 2 | 4 × 8 | 4 × 4 | 2 |
|  | 8 × 8 | 4 × 8 | 2 | 4 × 8 | 2 × 8 | 2 |
| 4:2:0 | 8 × 8 | 4 × 4 | 4 | 4 × 4 | 2 × 2 | 4 |
|  | 8 × 8 | 8 × 4 | 2 | 4 × 4 | 4 × 2 | 2 |
|  | 8 × 8 | 4 × 8 | 2 | 4 × 4 | 2 × 4 | 2 |

It is desirable to make the width and height of a block size to be a multiple of 4. Therefore, in the tenth embodiment of the present invention, when an 8×8 CB size is used, Chroma size is modified for color formats other than 4:4:4 as shown in Table 10. In Table 11, it illustrates an alternative chroma PB size selection.

TABLE 10

| Color Format | Luma CB size | Luma PB size | No. of PBs | Chroma CB size | Chroma PB size | No. of PBs |
| --- | --- | --- | --- | --- | --- | --- |
| 4:4:4 | 8 × 8 | 4 × 4 | 4 | 8 × 8 | 4 × 4 | 4 |
|  | 8 × 8 | 8 × 4 | 2 | 8 × 8 | 8 × 4 | 2 |
|  | 8 × 8 | 4 × 8 | 2 | 8 × 8 | 4 × 8 | 2 |
| 4:2:2 | 8 × 8 | 4 × 4 | 4 | 4 × 8 | 4 × 4 | 2 |
|  | 8 × 8 | 8 × 4 | 2 | 4 × 8 | 4 × 4 | 2 |
|  | 8 × 8 | 4 × 8 | 2 | 4 × 8 | 4 × 4 | 2 |
| 4:2:0 | 8 × 8 | 4 × 4 | 4 | 4 × 4 | 4 × 4 | 1 |
|  | 8 × 8 | 8 × 4 | 2 | 4 × 4 | 4 × 4 | 1 |
|  | 8 × 8 | 4 × 8 | 2 | 4 × 4 | 4 × 4 | 1 |

TABLE 11

| Color Format | Luma CB size | Luma PB size | No. of PBs | Chroma CB size | Chroma PB size | No. of PBs |
| --- | --- | --- | --- | --- | --- | --- |
| 4:4:4 | 8 × 8 | 4 × 4 | 4 | 8 × 8 | 4 × 4 | 4 |
|  | 8 × 8 | 8 × 4 | 2 | 8 × 8 | 8 × 4 | 2 |
|  | 8 × 8 | 4 × 8 | 2 | 8 × 8 | 4 × 8 | 2 |
| 4:2:2 | 8 × 8 | 4 × 4 | 4 | 4 × 8 | 4 × 8 | 1 |
|  | 8 × 8 | 8 × 4 | 2 | 4 × 8 | 4 × 8 | 1 |
|  | 8 × 8 | 4 × 8 | 2 | 4 × 8 | 4 × 8 | 1 |
| 4:2:0 | 8 × 8 | 4 × 4 | 4 | 4 × 4 | 4 × 4 | 1 |
|  | 8 × 8 | 8 × 4 | 2 | 4 × 4 | 4 × 4 | 1 |
|  | 8 × 8 | 4 × 8 | 2 | 4 × 4 | 4 × 4 | 1 |

Fifth Embodiment

After the adjustment in Chroma PB size, the original 1-to-1 Luma-Chroma correspondence is not valid any more. The number of Chroma PBs sometimes is smaller than the number of Luma PBs. Accordingly, the displacement vectors for Chroma PBs are adjusted in this embodiment. For color format 4:2:0, because there is only one Chroma PB, the displacement vector for this Chroma PB in one embodiment can be the average of all the displacement vectors of the Luma PBs in the same CB. In another example, the displacement vector for this Chroma PB can be the displacement vector for the first Luma PB in the same CB.

Figure 3:
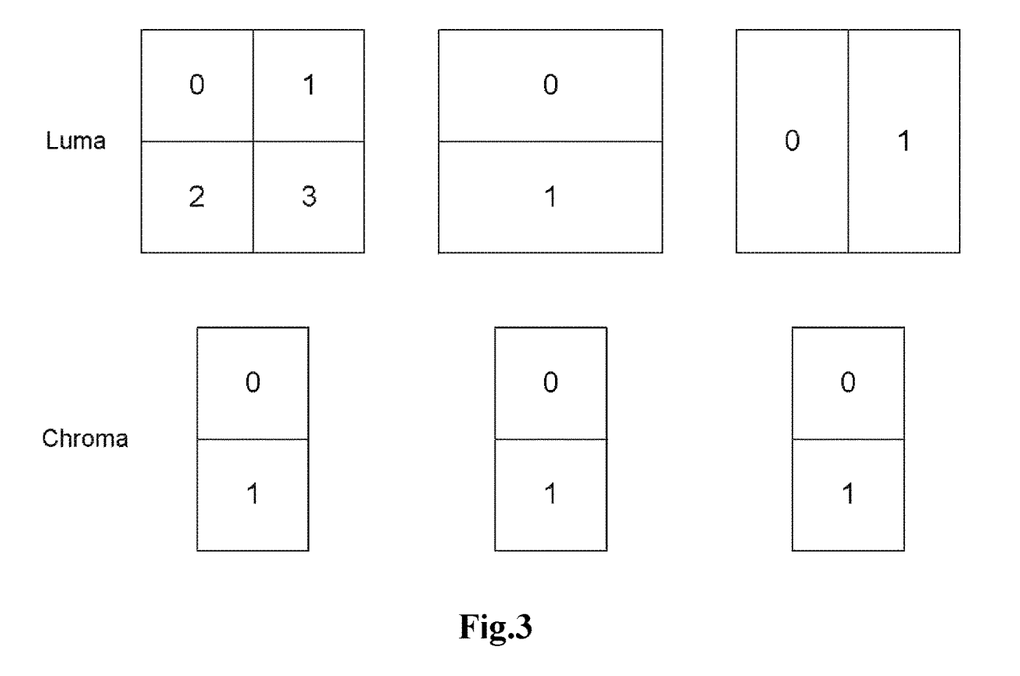
FIG. 3 illustrates an example of various partitions of a luma CB (coding block) and two partitions for a corresponding chroma CB in the case of 4:2:2 color format.
Figure 4:
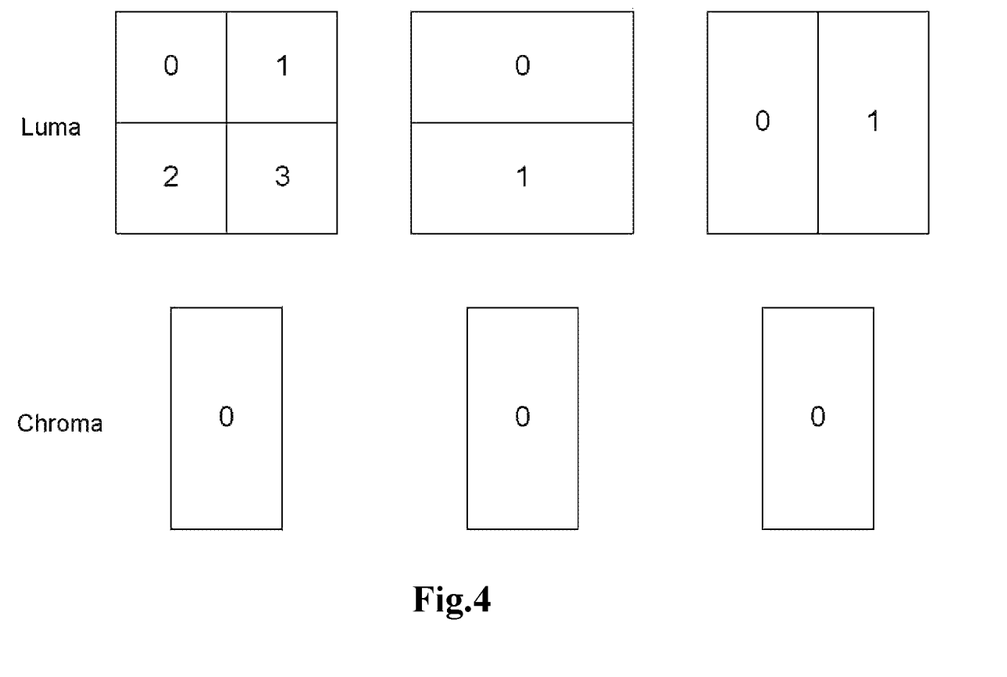
FIG. 4 illustrates an example of various partitions of a luma CB (coding block) and one partition for a corresponding chroma CB in the case of 4:2:2 color format.

For color format 4:2:2, the index and size of Luma-Chroma PB correspondences in 8×8 CB are shown in FIG. 3 and FIG. 4. Let $DV\_L(i)$ be the displacement vector for luma $PB_i$, where i=0, 1, 2, 3 for N×N PB size and i=0, 1 for 2N×N and N×2N PB sizes. Let $DV\_C(i)$ be the displacement vector for chroma $PB_i$, where i=0, 1.

Since the chroma resolution is different from the luma resolution, a proper scaling on displacement vector for the chroma component may be required. For the 4:2:0 format, the luma displacement vector should be scaled down by a factor of 2 when the vector is assigned to chroma displacement vector.

In FIG. 3, each chroma CB is partitioned into 2 chroma PBs. The corresponding luma PB can be N×N, N×2N and 2N×N. The displacement vector derivation is described as follows.

For N×N luma PB, the chroma displacement vector can be derived according to: $DV\_C(0)=(DV\_L(0)+DV\_L(1))/2$, $DV\_C(1)=(DV\_L(2)+DV\_L(3))/2$. In another example, the chroma displacement vector is derived according to: $DV\_C(0)=DV\_L(1)$, $DV\_C(1)=DV\_L(3)$. In yet another example, the chroma displacement vector is derived according to: $DV\_C(0)=DV\_L(0)$, $DV\_C(1)=DV\_L(2)$. In yet another embodiment, $DV\_C(0)=DV\_L(i)$ and $DV\_C(1)=DV\_L(i)$, i=0, 1, 2, 3.

For 2N×N luma PB, the chroma displacement vector can be derived according to: $DV\_C(0)=DV\_L(0)$, $DV\_C(1)=DV\_L(1)$. In another example, the chroma displacement vector is derived according to: $DV\_C(0)=(DV\_L(0)+DV\_L(1))/2$, $DV\_C(1)=(DV\_L(0)+DV\_L(1))/2$. In yet another example, the chroma displacement vector is derived according to: $DV\_C(0)=DV\_L(0)$, $DV\_C(1)=DV\_L(0)$.

For N×2N luma PB, the chroma displacement vector can be derived according to: $DV\_C(0)=DV\_L(0)$, $DV\_C(1)=DV\_L(1)$. In another example, the chroma displacement vector is derived according to: $DV\_C(0)=(DV\_L(0)+DV\_L(1))/2$, $DV\_C(1)=(DV\_L(0)+DV\_L(1))/2$. In yet another example, the chroma displacement vector is derived according to: $DV\_C(0)=DV\_L(0)$, $DV\_C(1)=DV\_L(0)$.

In FIG. 4, each chroma CB is partitioned into 1 chroma PB. The corresponding luma PB can be N×N, N×2N and 2N×N. The displacement vector derivation is described as follows.

For N×N luma PB, the chroma displacement vector can be derived according to: $DV\_C(0)=(DV\_L(0)+DV\_L(1)+DV\_L(2)+DV\_L(3))/4$. In another example, the chroma displacement vector is derived according to: $DV\_C(0)=DV\_L(i)$, i=0, 1, 2, 3.

For 2N×N luma PB, the chroma displacement vector can be derived according to: $DV\_C(0)=DV\_L(0)$. In another example, the chroma displacement vector is derived according to: $DV\_C(0)=(DV\_L(0)+DV\_L(1))/2$. In yet another example, the chroma displacement vector is derived according to: $DV\_C(0)=DV\_L(i)$, i=0,1.

For N×2N luma PB, the chroma displacement vector can be derived according to: $DV\_C(0)=(DV\_L(0)+DV\_L(1))/2$. $DV\_C(0)=DV\_L(0)$. In another example, the chroma displacement vector is derived according to: $DV\_C(0)=DV\_L(i)$, i=0, 1.

In the description for 2 chroma PBs and 1 chroma PB cases, a scaling factor may have to be applied to the Luma displacement vectors when the displacement vectors are used to predict the Chroma displacement vector. For example, in DV_C(0)=DV_L(0) case, if the color format is 4:2:0, this format should be written as DV_C(0)=0.5*DV_L(0) to indicate the resolution difference between Luma and Chroma. In the 4:2:2 case, the scaling factor in the x-direction and y-direction is different. Since the luma and chroma components have the same resolution in the y-direction, there is no need to scale in the y-direction.

Sixth Embodiment

Currently, when IntraBC is applied to the smallest CU (e.g. 8×8), it can be partitioned into four N×N PUs or two 2N×N/N×2N PUs, each of which will have an individual displacement vector. Each PU will have an individual predictor associated with its displacement vector, which comes from the last decoded CU or PU. A non-square PU can be further divided into two or more TUs (transform units). According to the twelfth embodiment, the decoded pixel reconstruction is done TU by TU in the IntraBC prediction mode.

Figure 5A:
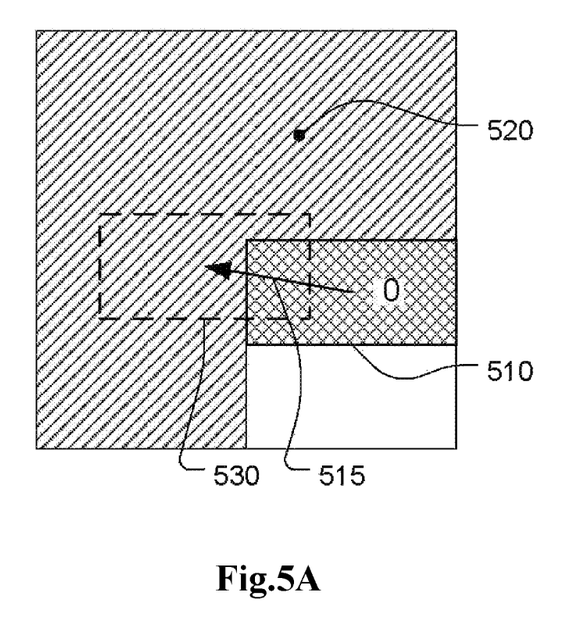
FIG. 5A illustrates an example of PU-based Intra-block copy (IntraBC) prediction.
Figure 5B:
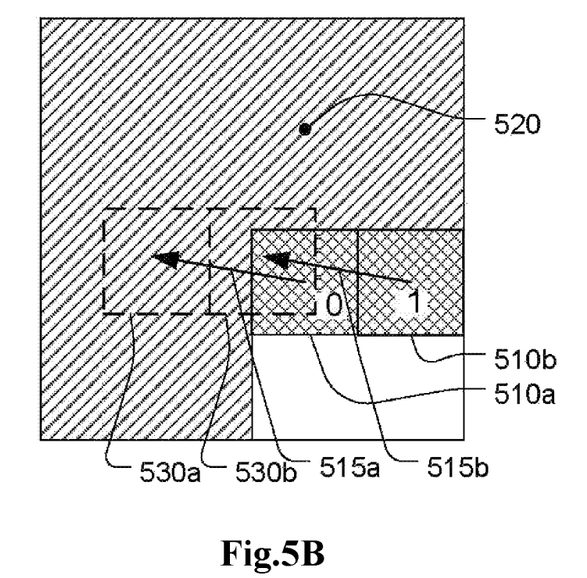
FIG. 5B illustrates an example of TU-based Intra-block copy (IntraBC) prediction according to an embodiment of the present invention.

Starting from the second TU in each CU, if the previous TUs have been reconstructed, those reconstructed pixels can be used for predicting the pixels in the current TU. If the PU is coded by a non-square IntaBC mode, some of the TUs within the same PU can be reconstructed before others. Therefore, the reconstructed TUs can be used to predict subsequent TUs in the same PU or a subsequent PU in the same CU. This will cause some previously unavailable area of a PU coded in the IntraBC mode to become available. Therefore, the performance can be improved. An example of TU by TU process is shown in FIG. 5B for an IntraBC coded block using information from reconstructed TUs. The corresponding PU by PU based process is shown in FIG. 5A. In FIG. 5A, block 510 corresponds to a current PU coded in the IntraBC mode. The slant-lines area indicates the reconstructed pixels that can be used for prediction. If the current PU 510 is predicted by a corresponding block 530 using displacement vector 515, a part of the prediction block 530 would not be available since it overlaps with part of the current PU (510). Therefore, the current PU cannot be predicted using the IntraBC mode. However, if TU by TU IntraBC mode is used according to one embodiment of the present invention, the IntraBC prediction may become available. As shown in FIG. 5B, the current PU is divided into two TUs (510*a* and 510*b*). If the IntraBC prediction is performed TU by TU and TU0 (510*a*) is processed before TU1 (510*b*), the prediction block 530*a* pointed by displacement vector 515*a* will become available since the whole block (530*a*) is in the reconstructed area. After TU0 (510*a*) is coded and reconstructed, the prediction block 530*b* pointed by displacement vector 515*b* will become available as well. Therefore, both TUs (510*a* and 510*b*) of the corresponding PU (510) can be predicted using IntraBC mode. On the other hand, if the PU had been processed as a whole, then it would point to an unavailable area, and therefore not valid. However, if TU-based IntraBC prediction process according to an embodiment of the present invention is used, prediction blocks will become available.

The TU level process has apparent benefit. However, this design may cause problems for parallel processing since the TUs in a PU have to be coded sequentially. The issue can be illustrated using the example in FIG. 5B. For TU1 (510*b*), the prediction block won't be available until TU0 is reconstructed. Accordingly, a variation of the embodiment is disclosed where the IntraBC TUs in the CU can only use reconstructed pixels outside the current CU. Separately, another variation of the embodiment requires that all IntraBC PUs in the CU derive the displacement predictor only from previously decoded CUs. Therefore, there will be no dependency on any previously decoded PU inside the same CU. Thus, any later PU will not rely on the displacement vector of its previous PU.

Figure 6:
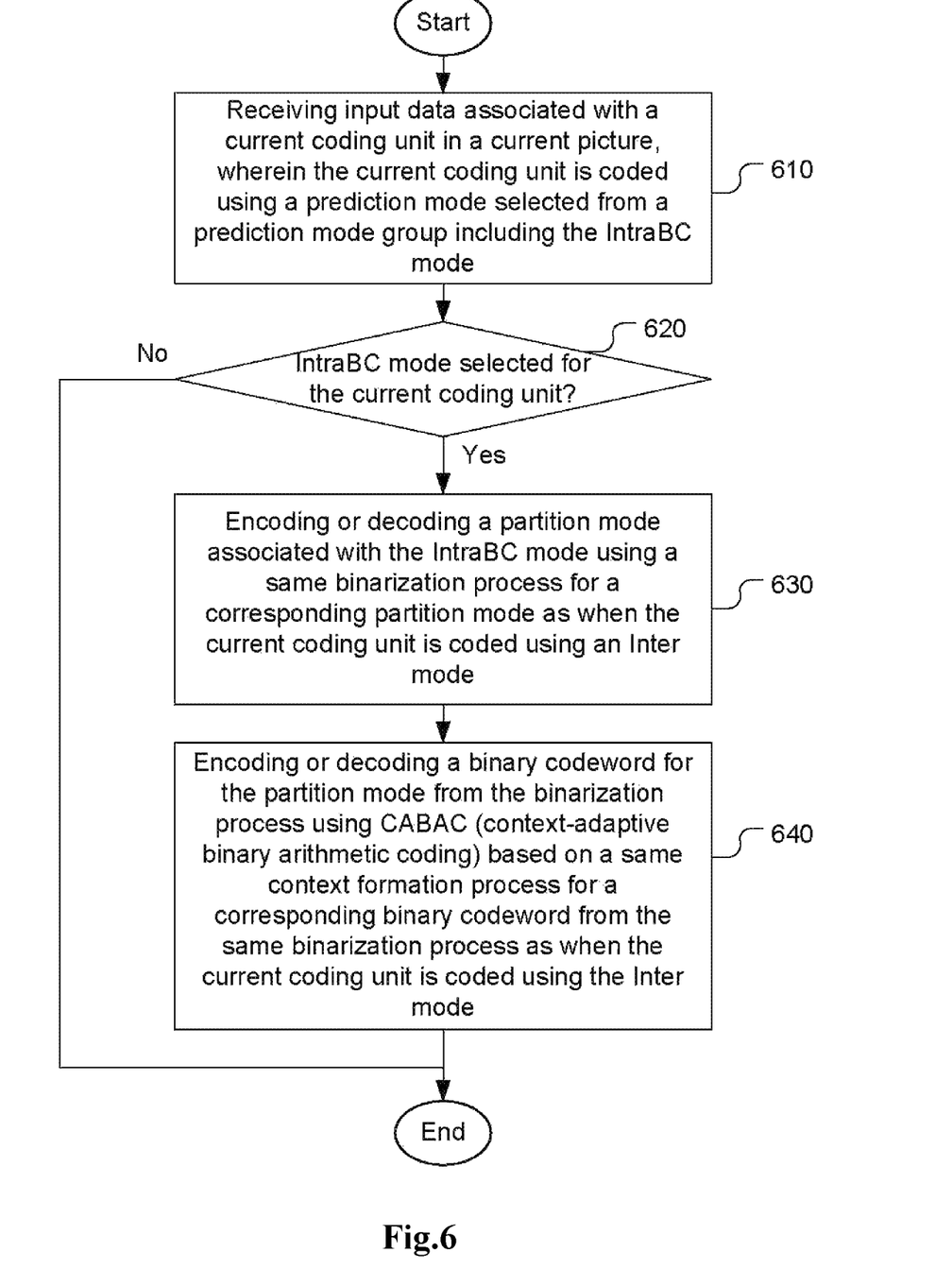
FIG. 6 illustrates a flowchart of an exemplary coding system incorporating an embodiment of the present invention, where the partition mode associated with IntraBC mode and the corresponding partition mode for Inter mode use the same binarization process and the same context modelling for CABAC (context-adaptive binary arithmetic coding).

FIG. 6 illustrates a flowchart of an exemplary system incorporating an embodiment of the present invention to allow IntraBC partition mode signaling to share the same context modelling with Inter partition mode signaling. The system receives input data associated with a current block in a current picture as shown in step 610, where the current coding unit is coded using a prediction mode selected from a prediction mode group including the IntraBC mode. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. The prediction mode is check in step 620 to determine whether the IntraBC mode is selected for the current coding unit. It the result is "Yes", steps 630 and 640 are performed. If the result is "No", steps 630 and 640 are skipped. In step 630, a partition mode associated with the IntraBC mode is encoded or decoded using a same binarization process for a corresponding partition mode as when the current coding unit is coded using an Inter mode. In step 640 a binary codeword for the partition mode from the binarization process is encoded or decoded using CABAC (context-adaptive binary arithmetic coding) based on a same context formation process for a corresponding binary codeword from the same binarization process as when the current coding unit is coded using the Inter mode.

Figure 7:
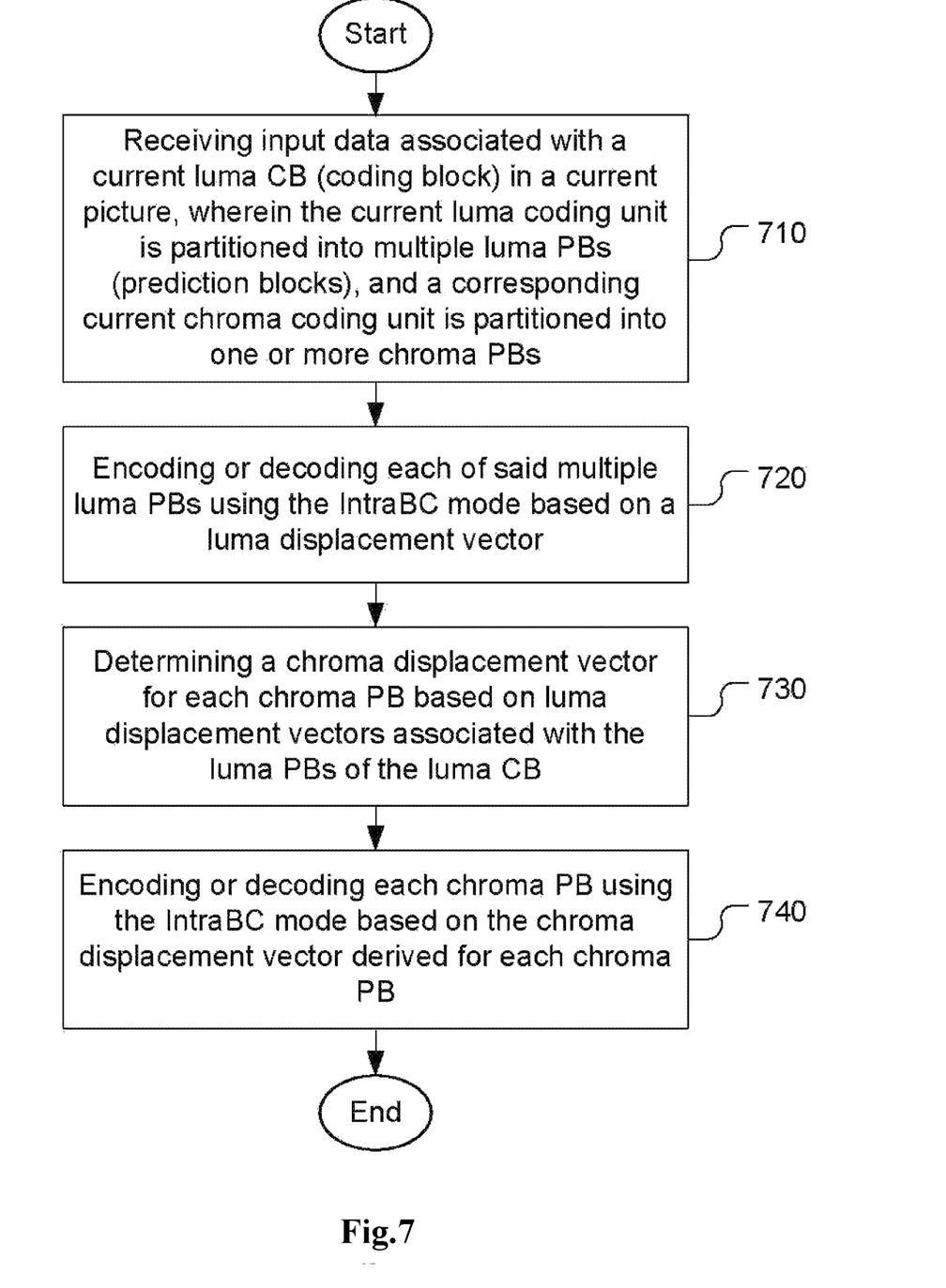
FIG. 7 illustrates a flowchart of an exemplary coding system incorporating an embodiment of the present invention, where the chroma displacement vector for each chroma PB (prediction block) is derived based on the luma displacement vectors associated with the luma PBs of the luma CB (coding block).

FIG. 7 illustrates a flowchart of an exemplary system incorporating an embodiment of the present invention, where the displacement vector of IntraBC prediction for the chroma block is derived from the displacement vectors of the corresponding luma block. The system receives input data associated with a current luma CB (coding block) in a current picture in step 710, where the current luma coding block is partitioned into multiple luma PBs (prediction blocks), and a corresponding current chroma coding block is partitioned into one or more chroma PBs. Each luma PB is encoded or decoded using the IntraBC mode based on a luma displacement vector in step 720. A chroma displacement vector for each chroma PB is determined based on luma displacement vectors associated with the luma PBs of the luma CB in step 730. Each chroma PB is then encoded or decoded using the IntraBC mode based on the chroma displacement vector derived for each chroma PU in step 740.

The flowcharts shown above are intended to illustrate examples of IntraBC coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of signaling of a coding mode selected from a prediction mode group for a picture, the prediction mode group including an Intra-block copy (IntraBC) mode, wherein the picture is divided into multiple coding units, the method comprising:
receiving input data associated with a current coding unit in the picture, wherein the current coding unit is coded using a prediction mode selected from the prediction mode group; and
in response to the IntraBC mode being selected for the current coding unit,
determining a binary string for a partition mode associated with the IntraBC mode, wherein the binary string for the partition mode associated with the IntraBC mode is the same as a corresponding binary string for a corresponding partition mode associated with an Inter mode when the Inter mode is selected; and
encoding or decoding the binary string for the partition mode associated with the IntraBC mode using context-adaptive binary arithmetic coding (CABAC) with one or more context models, wherein the one or more context models for encoding or decoding the binary string for the partition mode associated with the IntraBC are the same as corresponding one or more context models for encoding or decoding the corresponding binary string for the corresponding partition mode associated with the Inter mode when the Inter mode is selected,
wherein
the determining the binary string for the partition mode is performed based on a bin string assignment scheme, and
the bin string assignment scheme includes, in a case that an N×N mode is included in the bin string assignment scheme, assigning to the N×N mode a first bin string that has a greatest number of bits among all bin strings assigned to all partitioning modes included in the bin string assignment scheme.

2. The method of claim 1, wherein one or more high-level syntax elements are incorporated in a sequence level, a picture level or a slice level to indicate whether non-square partition is enabled.

3. The method of claim 1, wherein the partition mode is selected from a partition mode group including a 2N×2N mode, a 2N×N mode, an N×2N mode, and the N×N mode if the current coding unit is an 8×8 block.

4. The method of claim 3, wherein the same binary string maps the 2N×2N mode, the 2N×N mode, the N×2N mode, and the N×N mode to {1, 01, 001, 000} respectively, or {1, 001, 01, 000} respectively.

5. The method of claim 1, wherein the partition mode is selected from a partition mode group including a 2N×2N mode, a 2N×N mode and an N×2N mode if the current coding unit is larger than 8×8.

6. The method of claim 5, wherein the same binary string maps the 2N×2N mode, the 2N×N mode and the N×2N mode to {1, 01, 00} respectively or {1, 00, 01} respectively.

7. The method of claim 1, wherein the bin string assignment scheme includes, in a case that a 2N×N mode and the N×N mode are included in the bin string assignment scheme, assigning to the 2N×N mode a second bin string that has a same number of bits as the first bit string.

8. The method of claim 1, wherein the bin string assignment scheme includes, in a case that an N×2N mode and the N×N mode are included in the bin string assignment scheme, assigning to the N×2N mode a third bin string that has a same number of bits as the first bit string.

9. A method of video coding for color video data using coding modes including an Intra-block copy prediction (IntraBC) mode, wherein the color video data comprises a luma component and one or more chroma components, each color picture of the color video data is divided into multiple luma coding blocks and multiple chroma coding blocks, and the color video data uses a 4:2:2 or 4:2:0 color format, the method comprising:
receiving input data associated with a current luma coding block (CB) in a current picture, wherein the current luma coding block is partitioned into multiple luma prediction blocks (PBs), a corresponding current chroma coding block is partitioned into multiple chroma PBs, and each one of the chroma PBs corresponding to a plurality of luma PBs from the multiple luma PBs;
encoding or decoding each of the multiple luma PBs using the IntraBC mode based on a respective luma displacement vector;
determining chroma displacement vectors for the chroma PBs, respectively, based on luma displacement vectors associated with the corresponding luma PBs of the luma CBs; and encoding or decoding each of the chroma PBs using the IntraBC mode based on the corresponding one of the derived displacement vectors.

10. The method of claim 9, wherein
one of the chroma PBs corresponds to at least two of the luma PBs, and
the chroma displacement vector for the one of the chroma PBs is determined
from an average of luma displacement vectors associated with the at least two of the luma PBs, or
from only one of the luma displacement vectors associated with the at least two of the luma PBs.

11. A method of video coding for video data using coding modes including an Intra-block copy (IntraBC) anode for a picture, wherein the picture is divided into multiple coding units, the method comprising:
receiving input data associated with a current coding unit in the picture, wherein the current coding unit includes a non-square prediction unit (PU);
partitioning the non-square PU into multiple transform units (TUs);
determining a displacement vector for one of the TUs, the displacement vector specifying a prediction block for the one of the TUs, and the prediction block includes at least a portion of reconstructed samples of another one of the TUs of the non-square PU; and
encoding or decoding the non-square PU, including applying IntraBC coding on the one of the TUs according to the displacement vector.

12. The method of claim 11, wherein
the non-square PU is partitioned into two TUs.

* * * * *